*(12)* United States Patent
DeGroot, Jr. et al.

(10) Patent No.: US 6,417,263 B1
(45) Date of Patent: Jul. 9, 2002

(54) HEAT CURABLE SILICONE RUBBER COMPOSITION WITH IMPROVED RESISTANCE TO ENGINE OILS AND COOLANTS

(75) Inventors: Jonathan Vierling DeGroot, Jr.; Lawrence Dale Fielder; William James Schulz, Jr., all of Midland; Antony Pope Wright, Rhodes, all of MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/415,240

(22) Filed: Oct. 12, 1999

Related U.S. Application Data

(63) Continuation of application No. 09/058,926, filed on Apr. 13, 1998, now abandoned.

(51) Int. Cl.$^7$ .............................. C08J 5/10; C08K 3/34; C08L 83/04
(52) U.S. Cl. ..................... 524/492; 524/777; 524/706; 524/773; 524/701; 524/779; 524/788; 524/786
(58) Field of Search ................................ 524/174, 175, 524/176, 177, 404, 405, 127, 417, 296, 492, 493, 494, 777, 706, 773, 701, 779, 788, 786

(56) References Cited

U.S. PATENT DOCUMENTS 4,689,363 A  *  8/1987  Inoue et al. ................. 524/394
5,321,058 A  *  6/1994  Fuchigami et al. .......... 523/211

* cited by examiner

*Primary Examiner*—James J. Seidleck
*Assistant Examiner*—U. K Rajguru
(74) *Attorney, Agent, or Firm*—Willaim F. Boley; Jennifer S. Warren; Jim L. De Cesare

(57) ABSTRACT

A heat curable silicone rubber composition, having improved resistance to engine coolants and oils, including long-life coolants and synthetic motor oils, comprises:

(A) 100 parts by weight of an organosiloxane polymer base comprising an organosiloxane polymer containing at least 2 silicon-bonded alkenyl groups in each molecule and 1 to 65 weight percent reinforcing silica filler, (B) curing component sufficient to cure the composition when heated, and (C) an effective amount of at least one metal salt additive selected from the group consisting of monobasic alkali metal phosphates, alkali metal oxalates, alkali metal tartrates, alkali metal tetraborates, alkali metal phthalates, alkali metal citrates; dibasic metal phosphates where the metal is selected from the group consisting of sodium, potassium, calcium and magnesium; metal acetates, where the metal is selected from the group consisting of sodium, potassium, calcium, magnesium; metal sulfates where the metal is selected from the group consisting of sodium, potassium, calcium, magnesium, aluminum, and zinc; and metal carbonates where the metal is selected from the group consisting of sodium, potassium, calcium, magnesium, aluminum and zinc.

1 Claim, No Drawings

HEAT CURABLE SILICONE RUBBER COMPOSITION WITH IMPROVED RESISTANCE TO ENGINE OILS AND COOLANTS

This application is a continuation of 09/058926, Apr. 13, 1998, now abandoned

For which the following is a specification:

The present invention is a heat curable silicone rubber composition with high resistance to degradation by engine oils and coolants, and in particular, resistance to synthetic engine oils and long-life engine coolants.

Gaskets and packing materials formed from silicone rubber frequently suffer from poor resistance to hot hydrocarbon oils, for example, engine oil and gear oil, and from a poor resistance to radiator coolants. As a consequence, oil and coolant leaks may develop during the long-term use of silicone rubber as gasket materials in such applications.

Synthetic engine oils have as major components poly-alpha-olefins and esters which may break down to acids. Synthetic engine oils may also contain lesser amounts of additives such as oxidation inhibitors, rust inhibitors, anti-wear and extreme pressure agents, friction modifiers, detergents and dispersants, pour-point depressants, viscosity improvers, and foam inhibitors. These components of synthetic oils may interact with silicone rubber differently than do hydrocarbon oils, adversely impacting the sealing properties of the rubber.

Similarly, extended-life coolants may contain organic acids, such as aliphatic monobasic acids, hydrocarbyl dibasic acids, and the alkali metal, ammonium or amine salts of monobasic acids or hydrocarbyl dibasic acids as components that may interact with silicone rubber, in addition to conventional additives such as ethylene glycol, water, and corrosion inhibitors. See for example, U.S. Pat. No. 4,647,392 to Darden, et al. The acids and salts can attack the silicone rubber.

Fluorosilicone rubbers are generally known in the art for their resistance to fuel, oil, chemicals, and solvents. However, fluorosilicone rubbers are relatively costly materials, and not considered to be cost effective in many applications involving contact with engine oils and coolants. Therefore, there is a need to improve the performance of non-fluorinated silicone rubbers in contact with engine oils and coolants.

Inoue et al., in U.S. Pat. No. 4,689,363, teach compositions for room-temperature curable silicone rubber that are resistant to conventional engine oils. The compositions comprise 100 parts by weight of a hydroxy end-terminated polydiorganosiloxane having a linear molecular structure; from 1 to 25 parts by weight of an organosilicone having, in each molecule, at least two hydrolyzable groups bonded to the silicon atom or atoms; and from 1 to 50 parts of an alkali metal salt of a weak acid having a $pK_a$ in the range from 2.0 to 12.0 at 25° C. The polyorganosiloxane has a viscosity in the range of 25 to 500 Pa·s or preferably from 1 to 100 Pa·s at 25° C.

Koshii et al., in U.S. Pat. No. 5,013,781, teach compositions for room-temperature curable silicone rubber resistant to conventional coolants and hydrocarbon oils. A polyorganosiloxane composed of $R'_3SiO_{0.5}$ and $SiO_2$ units or $R'_3SiO_{0.5}$, $R_2'SiO$ and $SiO_2$ units is included at 1 to 50 weight parts in a composition containing 100 parts polydiorganosiloxane, 5 to 300 weight parts inorganic filler, 0.1 to 10 weight parts alkoxysilane adhesion promoter, and a ketoxime silicon compound crosslinker. Koshii et al. teach that the polyorganosiloxane functions in combination with the alkoxysilane adhesion promoter to improve the hydrocarbon oil and coolant (chemical) resistance of room-temperature curable silicone rubber. The molar ratio of the $R'_3SiO_{0.5}$ to $SiO_2$ in the polyorganosiloxane must be from 0.5:1 to 1.5:1. The polydiorganosiloxane is a flowable polymer, and has a viscosity within the range of 0.0001 to 0.1 $m^2/s$ at 25° C., and the chain terminals contain a silicon-bonded hydroxyl group or a silicon-bonded hydrolyzable group.

The approaches by Inoue et al. and Koshii et al. do not address the need for silicone compositions that are used in contact with synthetic engine oils or extended-life coolants. Furthermore, while these approaches are useful for room-temperature-vulcanizable compositions, they do not address the additional need for heat-curable silicone compositions with improved resistance to coolants and oils. Heat curable silicone rubbers are used in applications that experience much higher stress, and may possibly be exposed to higher temperature and pressure and harsher chemical environments. For example, a heat curable silicone rubber may be used in applications requiring tensile strengths of from about 60 to 106 $kg/cm^2$, while room-temperature-vulcanizable compositions are more typically useful at lower tensile strengths from about 10 to 35 $kg/cm^2$. More particularly, heat cured silicone rubber is used in engine and coolant system applications where such systems are under heat or pressure, and properties such as compression set and compression stress relaxation are of concern. Furthermore, heat curable silicone rubbers often have larger cross-sectional areas exposed to chemical agents, compared to room-temperature-vulcanizable silicone compositions, which are typically used in thin gaskets. This additional cross-sectional area exposes more surface to chemical attack. Further, as gaskets are exposed to temperature cycling, they tend to swell in oil or coolant when heated, and shrink when cooled. Thus, increased cross-sectional area of heat-cured silicone rubber gaskets significantly increases the chemical exposure of the entire gasket.

Therefore, a non-fluorinated, heat-curable silicone rubber composition is needed that is resistant to standard and long-term engine coolants, and standard hydrocarbon and synthetic motor oils.

DESCRIPTION OF THE INVENTION

This invention is a heat-curable silicone rubber composition comprising:

(A) 100 parts by weight of an organosiloxane polymer base comprising an organosiloxane polymer containing at least 2 silicon-bonded alkenyl groups in each molecule and about 1 to 65 weight percent reinforcing silica filler, (B) curing component sufficient to cure the composition when heated, and (C) an effective amount of at least one metal salt additive selected from the group consisting of
monobasic alkali metal phosphates, alkali metal oxalates, alkali metal tartrates, alkali metal tetraborates, alkali metal phthalates, and alkali metal citrates;

dibasic metal phosphates where the metal is selected from the group consisting of sodium, potassium, calcium and magnesium;

metal acetates, where the metal is selected from the group consisting of sodium, potassium, calcium, and magnesium;

metal sulfates where the metal is selected from the group consisting of sodium, potassium, calcium, magnesium, aluminum, and zinc; and metal carbonates where the metal is selected from the group consisting of sodium, potassium, calcium, magnesium, aluminum and zinc.

The compositions of this invention provide superior compression set and compression stress relaxation results over other silicone compositions.

Component A, the organosiloxane polymer base (the base), comprises a mixture of an organosiloxane polymer with reinforcing silica filler. The organosiloxane polymer in the base has the average composition of $R_aSiO_{(4-a)/2}$. In the formula R is selected from substituted and unsubstituted monovalent hydrocarbon groups and is exemplified by alkyl groups such as methyl, ethyl, and propyl; alkenyl groups such as vinyl, allyl, butenyl, and hexenyl; aryl groups such as phenyl; and aralkyls such as 2-phenylethyl. The subscript a is a value from 1.95 to 2.05.

The organosiloxane polymer has at least 2 silicon-bonded alkenyl groups in each molecule. The alkenyl groups can be bonded in pendant positions, at the terminal positions, or at both positions. The molecular structure of the organosiloxane polymer generally has a degree of polymerization (dp) in the range of from 200 to 20,000, and preferably has a dp in a range of 1000 to 20,000. This dp range includes polymers which are thick, flowable liquids as well as those that have a stiff, gum-like consistency. The organosiloxane polymer can be a homopolymer or a copolymer or a mixture of such polymers. The siloxy units comprising the organosiloxane polymer are exemplified by dimethylsiloxy, vinylmethylsiloxy, and methylphenylsiloxy. The molecular terminal groups in the organosiloxane polymer are exemplified by trimethylsiloxy, and vinyldimethylsiloxy groups. The organosiloxane polymer is exemplified by vinyldimethylsiloxy-endblocked dimethylsiloxane-vinylmethylsiloxane copolymer, vinyldimethylsiloxy-endblocked polydimethylsiloxane, vinylmethylhydroxysiloxy-endblocked dimethylsiloxane-vinylmethylsiloxane copolymer, and vinyldimethylsiloxy-endblocked dimethylsiloxane-methylphenylsiloxane-vinylmethylsiloxane copolymer. A preferred polymer is a vinyldimethylsiloxy-terminated polydimethylsiloxane gum comprising 0.142 mole percent of vinylmethylsiloxane units and exhibiting a plasticity of 55–65 mils based on ASTM D926.

The base also contains a reinforcing silica filler, to provide increased mechanical properties in the present heat cured silicone rubber composition. The filler can be any silica filler which is known to reinforce polydiorganosiloxane-and is preferably selected from finely divided, fumed and precipitated forms of silica and silica aerogels having a specific surface area of at least about 50 $m^2/g$, and preferably 150 to 400 $m^2/g$. The filler is typically added at a level of about 1 to 65 weight percent of the organosiloxane polymer base, and preferably in a range of 10 to 65 weight percent of the base.

It is preferred to treat the reinforcing silica filler to render its surface hydrophobic, as typically practiced in the silicone rubber art. This can be accomplished by reacting the reinforcing silica filler with a liquid organosilicon compound which contains silanol groups or hydrolyzable precursors of silanol groups. Compounds that can be used as filler treating agents, also referred to as anti-creping agents or plasticizers in the silicone rubber art, include such ingredientsas low molecularweight liquid hydroxy- or alkoxy-terminated polydiorganosiloxanes, including $\alpha,\omega$-silanediols, hexaorganodisiloxanes, cyclodimethylsiloxanes and hexaorganodisilazanes.

In addition to the organosiloxane polymer and reinforcing silica filler, the organosiloxane polymer base may also contain other additives, for example heat stability additives, anti-structure agents, pigments, and extending and semi-reinforcing fillers. Examples of additives include diatomaceous earths, ground quartz, zinc oxide, calcium carbonate, titania, and magnesium oxide. The proportion of such additional fillers will depend on the physical properties and other characteristics desired in the elastomer. Generally such additional fillers can be present in a proportion of from about 10 to 150 parts by weight of the organosiloxane polymer.

The curing component (B) can be any of the well-known curing systems known in the silicone elastomer art. For example, the curable silicone elastomer compositions of this invention may be cured to the elastomeric state by exposure to electron beams, ultraviolet rays, electromagnetic waves, or heat. Where heat is used as the curing mechanism, an organic peroxide curing agent may be used. Examples of suitable organic peroxide curing agents include 2,5-dimethyl-2,5-di(tert-butylperoxy)hexane,2,2-vis(t-butylperoxy)-p-diisopropylbenzene, 1,1,bis(t-butylperoxy)-3,3,5-trimethylcyclohexane, 2,5-dimethyl-2,5-di(tert-butylperoxy)hexyne-3, di-t-butylperoxide, benzoyl peroxide, p-chlorobenzoyl peroxide, dicumyl peroxide, tertiary butyl peracetate, tertiary butyl perbenzoate, monochlorobenzoyl peroxide, 2,4-dichlorobenzoyl peroxide, and tertiary butyl cumyl peroxide. A preferred organic peroxide curing agent is 2,5-dimethyl-2,5-di(tert-butylperoxy) hexane.

Another heat curing system which is applicable is where the curable silicone elastomer composition is cured by crosslinking the polyorganosiloxane with an organohydrogensiloxane crosslinker in the presence of a platinum group metal-containing catalyst. The organohydrogensiloxane crosslinker can contain an average of at least two silicon-bonded hydrogen atoms per molecule, and no more than one silicon-bonded hydrogen atom per silicon atom, the remaining valences of the silicon atoms being satisfied by divalent oxygen atoms or by monovalent hydrocarbon radicals comprising one to seven carbon atoms. The monovalent hydrocarbon radicals can be, for examples, alkyls such as methyl, ethyl, propyl, tertiary butyl, and hexyl; cylcoalkyls such as cyclohexyl; and aryls such as phenyl and tolyl. The platinum group metal-containing catalyst can be any such catalyst which is known to catalyze the reaction of silicon-bonded hydrogen atoms with silicon-bonded vinyl groups. By platinum group metal, it is meant ruthenium, rhodium, palladium, osmium, iridium, and platinum.

Component (C) is an effective amount of a metal salt additive selected from at least one of the group consisting of monobasic alkali metal phosphates; alkali metal oxalates; alkali metal tartrates; alkali metal tetraborates; alkali metal phthalates; alkali metal citrates; dibasic metal phosphates where the metal is selected from the group consisting of sodium, potassium, calcium and magnesium; metal acetates, where the metal is selected from the group consisting of sodium, potassium, calcium, magnesium; metal sulfates where the metal is selected from the group consisting of sodium, potassium, calcium, magnesium, aluminum, and zinc; and metal carbonates where the metal is selected from the group consisting of sodium, potassium, calcium, magnesium, aluminum and zinc.

Without wishing to be bound to any particular theory, the inventors propose that the metal salt additives imparting resistance to coolants and the metal salt additives imparting resistance to synthetic oil in the present invention act in a manner analogous to salts that are present in an aqueous buffer system. Aqueous buffer systems are well known in chemical arts, and are characterized by their ability to resist pH changes when diluted or when various amounts of acid or base or added. One reference describing how buffer systems work is Peters, Hayes, and Hieftje, "Aqueous Acid-Base Reactions," *Chemical Separation and Measurements*, W. B. Saunders Company, (1974) pp. 100–112. Silicone rubber is more stable in a chemical environment where the pH of a system is at neutral or near-neutral. In the present invention, metal salts which, in an aqueous system, are used in buffer solutions that maintain a pH in a range of about 3 to 8 may be useful.

For water-soluble metal salt additives, a pKa between 3 and 8 is useful. For metal salt additives with limited solubility, the salt should be capable of increasing the pH of a dilute aqueous acidic solution from a pH below 3 to a pH between about 3 and about 8, or from greater than 8 to between 3 and 8.

By effective amount of a metal salt additive it is meant an amount that provides a heat curable silicone rubber composition retaining greater than 35 percent of the sealing force when exposed to long life coolant for 6 weeks in a compression stress relaxation (CSR) test, or retaining more than 10 percent of sealing force and having a compression set of at most 40 percent after 6 weeks in synthetic motor oil. Compression stress relaxation is a described below in the examples. A typical effective amount will be in the range of about 0.5 to 20 weight parts salt for 100 weight parts organosiloxane polymer base.

When resistance to long life coolants is desired, the metal salt additive is preferably an alkali metal monobasic salt selected from the group consisting of phosphates, oxalates, tartrates, tetraborates, phthalates, citrates, acetates, sulfates, and carbonates. The alkali metal of such salt may be sodium or potassium, though not limited to these. A preferred alkali metal monobasic salt for this purpose is monosodium phosphate. When monosodium phosphate, $NaH_2PO_4$, is used, a useful amount is about 0.5 to 7.5 parts by weight monosodium phosphate per 100 parts by weight of the organosiloxane base. Amounts below about 0.5 parts by weight of monosodium phosphate per 100 weight parts organosiloxane base may give less than the desired resistance to the extended life coolant. Surprisingly, the effectiveness is reduced for amounts over about 7.5 parts by weight monosodium phosphate per 100 weight parts organosiloxane base.

When resistance to synthetic motor oil is desired, the metal salt additive is preferably a dibasic metal salt selected from the group consisting of dibasic metal phosphates where the metal is selected from the group consisting of sodium, potassium, calcium and magnesium; dibasic alkali metal oxalates; dibasic alkali metal tartrates; dibasic alkali metal tetraborates; dibasic alkali metal phthalates; dibasic alkali metal citrates; metal acetates, where the metal is selected from the group consisting of sodium, potassium, calcium, magnesium; metal sulfates where the metal is selected from the group consisting of sodiurn, potassium, calcium, magnesium, aluminum, and zinc; and metal carbonates where the metal is selected from the group consisting of sodium, potassium, calcium, magnesium, aluminum and zinc. A preferred salt is disodium phosphate, $Na_2HPO_4$. When disodium phosphate is used a preferred amount is in a range from about 0.5 to 20 weight parts per hundred weight parts organosiloxane base. Concentrations of disodium phosphate below about 0.5 weight parts per 100 parts of organosiloxane base do not provide the desired resistance to motor oil. At concentrations above about 20 parts the physical properties of the heat-curable elastomer are not desirable.

A combination of metal salt additives can be used to provide resistance to both coolants and oils. Where a combination of metal salt additives is used, the total amount of the salts should not exceed 20 parts of the combined weight of metal salt additives per hundred weight parts of organosiloxane polymer base. As above, the physical properties of the heat curable silicone elastomer are not desirable above about 20 weight parts of salt in the organosiloxane polymer base.

The compositions of the present invention may be prepared by any convenient procedure. The organosiloxane polymer base and the additive (C) may be mixed together with any additional fillers or other ingredients, with sufficient heat and shear to form a uniform base. In a preferred method, a high consistency organosiloxane polymer base is formed first, by mixing the organosiloxane polymer with any additional fillers or other ingredients, and then the metal salt additive (C) is incorporated into the base, using a mixing device, such as a two-roll mill.

EXAMPLES

Materials

The following materials were used as media for testing elastomer compositions:

OIL 1 is MOBIL 1 Advanced Formula 5W-30 synthetic motor oil, API Service SJ/CF, from Mobil Oil Corporation, Fairfax, Va. This oil is formulated from poly-alpha-olefin and ester, together with an additive package.

OIL 2 is MOBIL 5W-30 High Performance, API Service SJ, from Mobil Oil Corporation, Fairfax, Va.

COOLANT 1 is Havoline DEX-COOL® Extended Life Anti-Freeze/Coolant, Code 7995, manufactured by Texaco Lubricants Company, Houston, Tex. This is a single-phase ethylene glycol type universal automotive engine coolant, which incorporates organic acid carboxylate corrosion inhibitor technology, mixed 50/50, by volume, with deionized water.

Test Methods

All samples were compounded on a 2-roll mill. Standard test slabs were molded 10 minutes at 171° C. following ASTM procedures. The following standard tests were conducted on the test materials evaluated: durometer, Shore A-2 (ASTM D 2240); tensile strength, elongation, and modulus (ASTM D 412); and compression set (ASTM D395B) for 22 hours at 177° C.

A hot oil compression set test was used as an indicator of gasket performance. Square cross-section o-rings (25 mm O.D.×17 mm I.D.×4-mm thick) were compression-molded for 15 minutes at 171° C. The o-rings were then placed between two parallel steel plates with a central hole compressed 20% using shims and corner bolts, and submerged in motor oils at 150° C. Every two weeks the fixtures containing the o-rings were cooled to room temperature, removed from the oil, disassembled, and measured for height loss after stabilizing for a day. Compression sets were then calculated from this data. The oil was changed at each inspection interval, before restarting the test using the same test specimens. The test was continued for several weeks, or until 100% compression set occurred. The results are reported as the percentage of compression set observed.

A compression stress relaxation (CSR) test was also used to test gasket performance. This method is described in ASTM D6147 test procedure for "Rubber, Vulcanized Determination of Force Decay (Stress Relaxation) in Compression." The test was conducted using 19 mm O.D.×12.5 mm I.D. o-rings, die-cut from slabs molded 10 minutes at 171° C. Oil testing was done with 2-mm thick o-rings, and coolant testing was done with 3-mm thick o-rings. The rings were placed in Jamak CSR test fixtures, compressed 25%, then measured for initial sealing force one-half hour after set-up. The test fixtures were then put in containers and covered with test fluids. The containers were placed in ovens at 150° C. for oil testing. For coolant testing, the fixtures were placed in coolant in pressure vessels to prevent water evaporation at 125° C. test temperatures. Sealing force measurements were taken after one and three days, then weekly throughout the rest of the tests. The fixtures were removed from the hot test fluids and cooled to room temperature (about 2 hours) before force measurements were taken using a Shawbury-Wallace testing tower to measure sealing forces over time. Oils were changed weekly, whereas the same coolant mixture was used throughout the test. Percentage sealing force retention was then determined from the force measurements.

For CSR oil testing, Mobil 1 synthetic oil was used. Both Mobil 1 and Mobil 5W-30 HP oils were used for hot oil compression set testing.

The base material (Base 1) used in the examples was produced in a dough mixer. It contained the following materials: 65–70 weight percent of a polyvinylmethyl-dimethylsiloxane gum co-polymer containing 0.1 mole percent of a vinyldimethyl-endblocked-polyvinylmethylsiloxane; 4–6 weight percent- of a hydroxyl endblocked-polyphenylmethylsiloxane process aid; 0.5 to 1.5 weight percent-polyvinylmethylsiloxane fluid process aid; 20–35 weight percent-fumed silica having a surface area of about 200 $m^2/g$; and a trace amount of ammonia. The ingredients were mixed and heated for several hours at elevated temperature to make a shelf-stable silicone rubber base.

The materials tested were compounded using a standard laboratory 2-roll mill. The following ingredients were used: (Base 1) base material, (Filler) 5 micron Min-Sil®, U.S. Silica, Berkley Springs, W. Va., (Pigment) black pigment (50% carbon black/50% polyvinylmethylsiloxane gum), (Curing agent 1) 2,5-Dimethyl-2,5-di(tert-butylperoxy) hexane (mixed at 45% in inert carriers), (Additive 1) monosodium phosphate, and (Additive 2) disodium phosphate. Quantities used are shown in Table 1. Test Results are shown in Table 2. The results show that in the coolant, 74% of the sealing force was retained in the CSR test when the curable sample contained 2.56 weight parts monosodium phosphate. This demonstrates an improvement in sealing force retention over samples with no monosodium phosphate. Surprisingly, when 8.11 parts of monosodium phosphate was used, there was not a significant difference in the CSR test results compared to samples with no monosodium phosphate.

The results also show that samples with disodium phosphate showed lower hot oil compression set values and higher percent sealing force retention in CSR tests, than samples without disodium phosphate.

TABLE 1

| | Test formulations | | | | | |
|---|---|---|---|---|---|---|
| Compounds | A | B | C | D | E | F |
| Base 1, wt. Parts | 100 | 100 | 100 | 100 | 100 | 100 |
| Filler, wt. Parts | 20.0 | 21.6 | 28.9 | 21.6 | 20.5 | 21.3 |
| Pigment, wt. Parts | 1.00 | 1.08 | 1.04 | 1.08 | 1.02 | 1.06 |
| Curing agent, wt. parts | 1.00 | 1.08 | 1.04 | 1.08 | 1.02 | 1.06 |
| Additive 1, wt. Parts | 0.00 | 0.00 | 0.00 | 8.11 | 2.56 | 1.33 |
| Additive 2, wt. Parts | 0.00 | 8.11 | 3.90 | 0.00 | 0.00 | 5.33 |

TABLE 2

| Compounds | A | B | C | D | E | F |
|---|---|---|---|---|---|---|
| Durometer, Shore A-2, points | 64 | 66 | 65 | 65 | 65 | 65 |
| Tensile Strength, MPa | 8.4 | 4.8 | 5.6 | 7.4 | 7.7 | 4.8 |
| Elongation, % | 285 | 165 | 185 | 275 | 275 | 160 |
| Modulus at 100% Elongation, MPa | 2.8 | 2.8 | 2.9 | 2.8 | 2.8 | 2.8 |
| Hot Air Compression Set after 22 h at 177° C., % | 6 | 11 | 11 | 23 | 16 | 13 |

TABLE 2-continued

| Compounds | A | B | C | D | E | F |
|---|---|---|---|---|---|---|
| Hot Oil Compression Set after 4 weeks in Oil 1 at 150° C., % | 100 | 29 | 25 | 94 | 100 | 33 |
| Hot Oil Compression Set after 4 weeks in Oil 2 at 150° C., % | 52 | 22 | 17 | 52 | 93 | 17 |
| Compression Stress Relaxation after 6 weeks in Oil 1 at 150° C., sealing force retained, % | 0 | 18 | 19 | 0 | 16 | 17 |
| Compression Stress Relaxation after 6 weeks in Coolant 1 at 125° C., sealing force retained, % | 22 | 5 | 21 | 12 | 74 | 15 |

We claim:

1. A heat curable silicone rubber composition having improved resistance to engine coolants and oils comprising:

(A) 100 parts by weight of an organosiloxane polymer base comprising an organosiloxane polymer containing at least two silicon bonded alkenyl groups in each molecule, and 1–65 weight percent of a reinforcing silica filler;

(B) a curing component sufficient to cure the composition when heated comprising an organohydrogen siloxane crosslinking agent and a platinum metal group containing catalyst;

(C) 0.5–7.5 parts by weight, per 100 parts by weight of organosiloxane polymer base (A), of at least one metal salt additive, the metal salt additive being an alkali metal monobasic salt of a phosphate, oxalate, tartrate, tetraborate, phthalate, citrate, acetate, sulfate, or carbonate, to provide a heat curable silicone rubber composition retaining greater than 35 percent of the sealing force when exposed to long life coolant for six weeks in a compression stress relaxation test, or retaining more than 10 percent of sealing force and having a compression set of at most 40 percent after six weeks in synthetic motor oil.

* * * * *